United States Patent
Yamaguchi et al.

(10) Patent No.: US 10,033,549 B2
(45) Date of Patent: Jul. 24, 2018

(54) INTER-NETWORK CONNECTION CONTROL DEVICE, AND CONNECTION CONTROL METHOD

(71) Applicant: NTT DOCOMO, INC., Tokyo (JP)

(72) Inventors: Hiromasa Yamaguchi, Tokyo (JP); Subrata Biswas, Tokyo (JP); Akihide Sasabe, Tokyo (JP); Masataka Ikeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 29 days.

(21) Appl. No.: 15/303,631

(22) PCT Filed: Dec. 24, 2015

(86) PCT No.: PCT/JP2015/086055
§ 371 (c)(1),
(2) Date: Oct. 12, 2016

(87) PCT Pub. No.: WO2016/104622
PCT Pub. Date: Jun. 30, 2016

(65) Prior Publication Data
US 2017/0033948 A1 Feb. 2, 2017

(30) Foreign Application Priority Data
Dec. 25, 2014 (JP) ................ 2014-263560

(51) Int. Cl.
*H04L 12/66* (2006.01)
*H04L 29/06* (2006.01)
(Continued)

(52) U.S. Cl.
CPC ........ *H04L 12/66* (2013.01); *H04L 29/06326* (2013.01); *H04L 29/08576* (2013.01);
(Continued)

(58) Field of Classification Search
CPC ............ H04L 29/08576; H04L 12/283; H04L 12/40097; H04L 29/06326; H04L 12/46; H04L 12/66; H04W 76/00; H04W 76/02
See application file for complete search history.

(56) References Cited

U.S. PATENT DOCUMENTS

| 2013/0246632 A1 | 9/2013 | Ginde |
| 2013/0304930 A1 | 11/2013 | Belling |
| 2015/0055550 A1* | 2/2015 | Suryavanshi ......... H04W 60/00 370/328 |

FOREIGN PATENT DOCUMENTS

JP   H11-355358 A   12/1999

OTHER PUBLICATIONS

International Search Report issued in PCT/JP2015/086055 dated Mar. 22, 2016 (2 pages).
(Continued)

*Primary Examiner* — Ashley L Shivers
(74) *Attorney, Agent, or Firm* — Osha Liang LLP (57) ABSTRACT

An inter-network connection control device that is used for interconnecting a communication network and another communication network includes a request signal forwarding unit that forwards a connection request signal transmitted from originating user equipment in the communication network to the other communication network, and a response signal processor that receives, from the other communication network, a plurality of response signals with respect to the connection request signal, the plurality of response signals being forked in the other communication network receiving the connection request signal and being forwarded to a plurality of terminating user devices, and that forwards one response signal of the plurality of response signals to the originating user equipment.

14 Claims, 8 Drawing Sheets (51) Int. Cl.
*H04L 29/08* (2006.01)
*H04M 3/00* (2006.01)
*H04L 12/761* (2013.01)

(52) U.S. Cl.
CPC .......... *H04L 45/16* (2013.01); *H04L 65/1036* (2013.01); *H04M 3/00* (2013.01)

(56) References Cited

OTHER PUBLICATIONS

Written Opinion of the International Searching Authority issued in PCT/JP2015/086055 dated Mar. 22, 2016 (4 pages).
3GPP TS 23.228 V13.0.0; "3rd Generation Partnership Project; Technical Specification Group Services and System Aspects; IP Multimedia Subsystem (IMS); Stage 2 (Release 13)"; Sep. 2014 (311 pages).
3GPP TS 24.182 V12.0.0; "3rd Generation Partnership Project; Technical Specification Group Core Network and Terminals; IP Multimedia Subsystem (IMS) Customized Alerting Tones (CAT); Protocol Specification (Release 12)"; Jun. 2014 (141 pages).
3GPP TS 24.229 V13.0.0; "3rd Generation Partnership Project; Technical Specification Group Core Network and Terminals; IP multimedia call control protocol based on Session Initiation Protocol (SIP) and Session Description Protocol (SDP); Stage 3 (Release 13)"; Dec. 2014 (858 pages).
Rosenberg, J. et al.; Network Working Group Memo; Category: Standards Track; "SIP: Session Initiation Protocol"; The Internet Society, Jun. 2002 (296 pages).

* cited by examiner

INTER-NETWORK CONNECTION CONTROL DEVICE, AND CONNECTION CONTROL METHOD

TECHNICAL FIELD

The present invention relates to an interconnection technique between communication networks.

BACKGROUND ART

As a platform through which a telecommunication carrier can flexibly and securely provide an IP multimedia service to a user, an IMS (IP Multimedia Subsystem) has been standardized (Non-Patent Document 1).

For example, a mobile network operator (which is referred to as an "operator," hereinafter) constructs an IP-based network (a core network) by the IMS to provide a mobile communication service to a user through an access network, such as those of an LTE/3G. Additionally, by establishing an IP interconnection (which is referred to as an "interconnection," hereinafter) between operators, communication between users subscribing to different operators is enabled.

PRIOR ART DOCUMENT

Non-Patent Document

Non-Patent Document 1: 3GPP TS 23.228 V13.0.0 (2014-09)
Non-Patent Document 2: 3GPP TS 24.182 V12.0.0 (2014-06)

SUMMARY OF INVENTION

Problem to be Solved by the Invention

In a SIP (Session Initiation Protocol) network, such as the IMS network, a device in the network may support a forking service (forking, a forking communication) where a received request is forked to be transmitted to a plurality of destinations. As an example of a service where forking is used, there is a forking model (forking model) for CAT (Customized Alerting Tones) media transmission, which is specified in the 3GPP standard specification of Non-Patent Document 2.

In the CAT media transmission service, a CAT-AS transmits, by forking, a connection request signal to one or a plurality of destination UEs (user equipment) to establish an early dialog between the originating UE and the terminating UE as well as an early dialog between the CAT-AS and the originating UE; and early media is transmitted to the originating UE through the dialog. Upon receiving a last response from the originating UE, the early media is stopped.

Note that, in general, the early media means to establish, by transmitting a connection request by the originating UE, a media path by a temporary response of the originating UE prior to transmitting the last response; and, for example, the early media is used, by a service provider, to provide a ringback tone or to provide an announcement.

Figure 1:
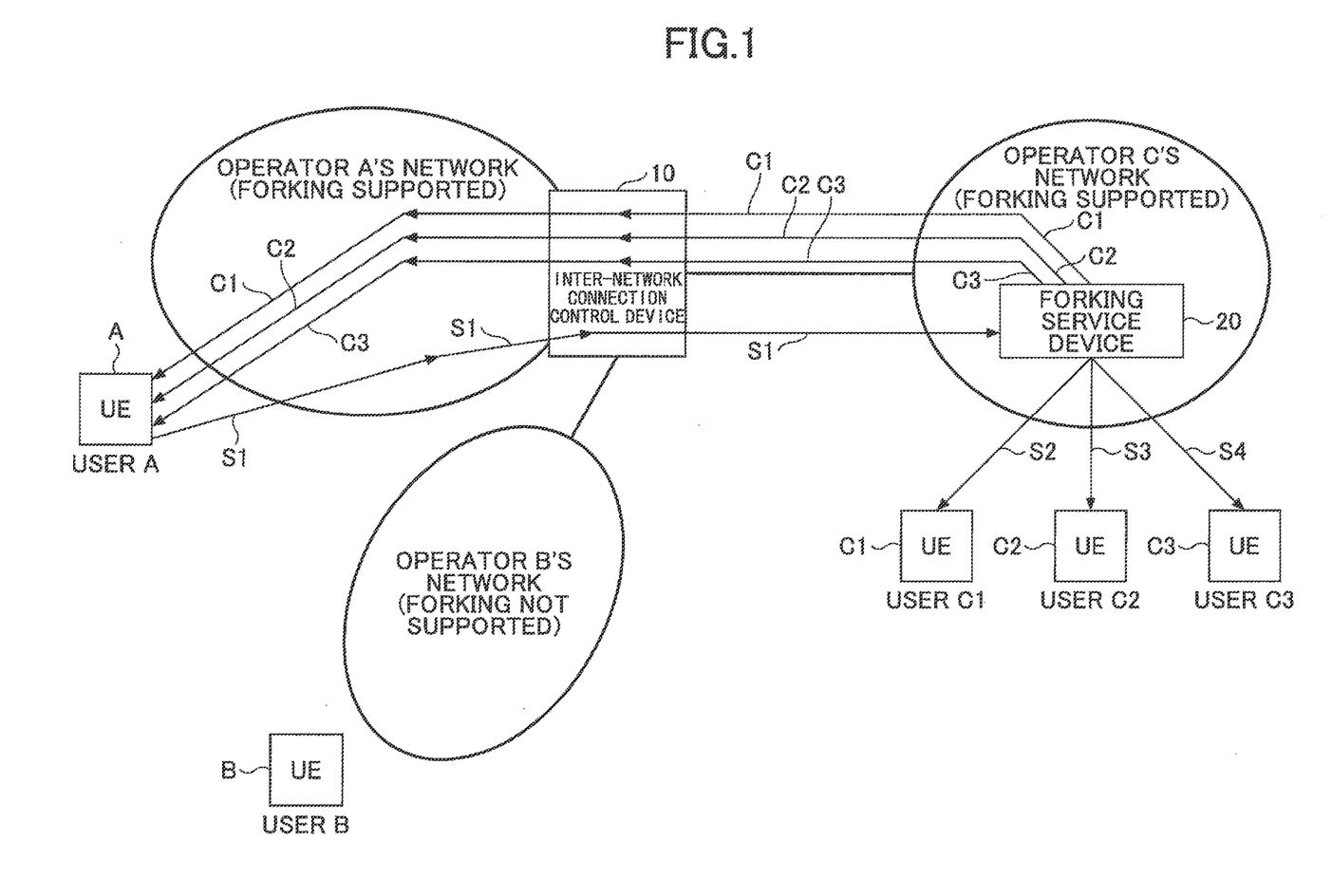
FIG. 1 is a diagram illustrating a problem.
Figure 2:
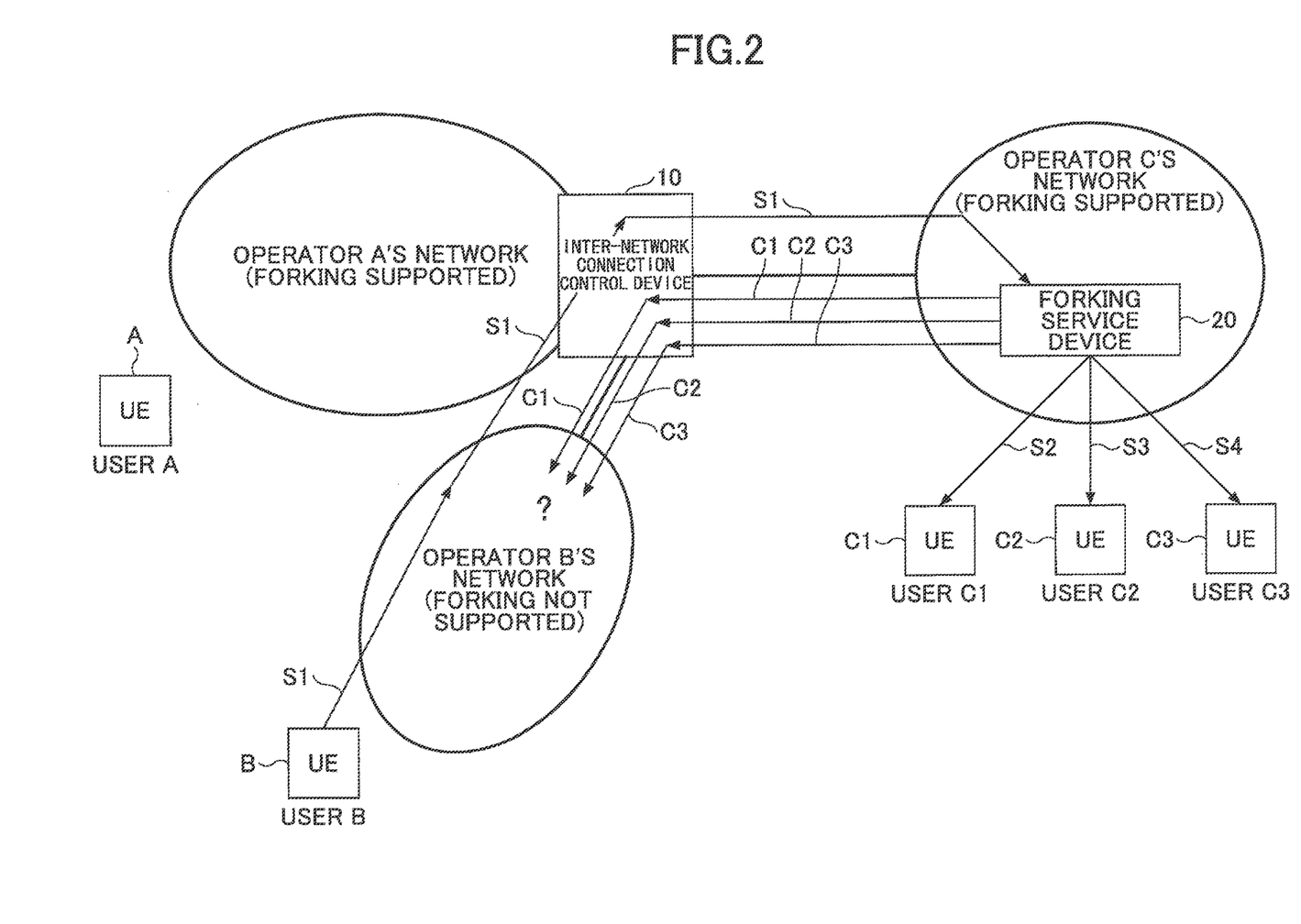
FIG. 2 is a diagram illustrating the problem.

By referring to FIG. 1 and FIG. 2, an example is described where, for a case of establishing an interconnection between operator's networks, forking is executed, as in the case of the forking model of the CAT media.

In the configuration example illustrated in FIG. 1 and FIG. 2, an operator A's network that is a network of the operator A, an operator B's network that is a network of the operator B, and an operator C's network that is a network of the operator C are interconnected.

FIG. 1 is a diagram especially focusing on the operator A's network, and an inter-network connection control device 10 that is installed at a boundary portion of the operator A's network is illustrated; however, an inter-network connection control device may be installed at a boundary portion of another operator's network. A usual inter-network connection control device 10 basically executes an operation to transfer a signal (a request, a response) received from a network to another network. Namely, for a case where a plurality of signals is received from a network, the plurality of signals is transmitted to another network.

In the example of FIG. 1, the operator A's network and the operator C's network are IMS networks; and the above-described forking is supported. The operator B's network is a non-IMS network; and forking is not supported. For example, the operator B's network is an IP centrex network for use within the company of the operator B. Here, to support forking means that a forking model of the CAT specified, for example, in Non-Patent Document 2 is supported. However, even if the forking model of the CAT specified in Non-Patent Document 2 is not supported, there is a case where forking according to another service is supported. Furthermore, there is a case where, for example, a gateway model other than the CAT forking specified in Non-Patent Document 2 is supported. It is assumed that the operator B's network does not support any forking. Note that, for forking, a plurality of response signals is returned for a single connection request signal, so that a function for executing forking, such as that of managing a plurality of early dialogs based on the single connection request signal, is required in a device within the network, so as to implement forking.

As illustrated in FIGS. 1 and 2, a forking service device 20 including a function to transmit the connection request signal by forking is installed in the operator C's network. The forking service device 20 is, for example, a CAT-AS.

By referring to FIG. 1, first, an example of a procedure is described for a case where a call is originated from a user A (UE-A) who is a subscriber of the operator A that supports forking to users C1, C2, and C3 who are subscribers of the operator C.

Upon an operation for originating a call to a representative number that is common among the UE-C1 through UE-C3 (which is referred to as a "user C representative number," hereinafter) being made to the UE-A by the user A, for example, a connection request signal that includes, as a destination, the user C representative number is transmitted; and the connection request signal is transmitted to the forking service device 20 through the inter-network connection control device 10 (step 1).

The forking service device 20 transmits connection request signals to the UE-C1 through UE-C3, which correspond to the user C representative number (step 2 through 4).

After that, response signals (e.g., temporary response signals) are returned from UE-C1 through UE-C3; and the response signals from the corresponding UEs are returned from the forking service device 20 to the UE-A, which originates the call, through the inter-network connection control device 10 (the lines indicated by C1, C2, and C3 in FIG. 1). In the example indicated in FIG. 1, since the operator A's network supports forking, the operator A's network can respond to the plurality of response signals with respect to the single connection request signal, so that forking operation can be normally executed.

Next, by referring to FIG. 2, an example of a procedure is described for a case where a call is originated from the user B who is a subscriber of the operator B that does not support forking to the users C1, C2, and C3 who are subscribers of the operator C.

Upon an operation for originating a call to the user C representative number being made to the UE-B by the user B, a connection request signal that includes, as a destination, the user C representative number is transmitted; and the connection request signal is transmitted to the forking service device 20 through the inter-network connection control device 10 (step 1).

The forking service device 20 transmits connection request signals to UE-C1 through UE-C3, which correspond to the user C representative number (step 2 through 4).

After that, response signals (e.g., temporary response signals) are returned from UE-C1 through UE-C3; the response signals from the corresponding UEs are transferred from the forking service device 20 to the inter-network connection control device 10; and the inter-network connection control device 10 transmits the response signals to the UE-B (the lines indicated by C1, C2, and C3 in FIG. 2). However, since the operator B's network does not support forking, a proper operation may not be executed in the operator B's network, so that the response signals may not properly reach the UE-B, and an early dialog may not be established. Consequently, for example, if the forking service device 20 is a device for providing a CAT media service, early media may not flow to the UE-B. Furthermore, the operator B that does not support forking may not determine for which dialog a connection is to be established, so that an erroneous connection may be established.

In addition, for a case where forking is supported by a network that relays a signal, and a terminal (UE) that originates a call and that is connected to the network does not support forking, the above-described erroneous connection may occur. The "communication network" in the description of the object below is used in a broad meaning including the network that relays the signal, and the terminal.

The present invention has been achieved in view of the above-described point, and an object is to provide, in an interconnected network where a plurality of communication networks is connected, a technique to allow communication according to forking to be properly executed between a communication network that supports forking and a communication network that does not support forking.

Means for Solving the Problem

According to an embodiment of the present invention, there is provided an inter-network connection control device that is used for interconnecting a communication network and another communication network, the inter-network connection control device including a request signal forwarding unit that forwards a connection request signal transmitted from originating user equipment in the communication network to the other communication network; and a response signal processor that receives, from the other communication network, a plurality of response signals with respect to the connection request signal, the plurality of response signals being forked in the other communication network receiving the connection request signal and being forwarded to a plurality of terminating user devices, and that forwards one response signal of the plurality of response signals to the originating user equipment.

Further, according to an embodiment of the present invention, there is provided a connection control method to be executed by an inter-network connection control device that is used for interconnecting a communication network and another communication network, the connection control method including a request signal forwarding step of forwarding a connection request signal transmitted from originating user equipment in the communication network to the other communication network; and a response signal processing step of receiving, from the other communication network, a plurality of response signals with respect to the connection request signal, the plurality of response signals being forked in the other communication network receiving the connection request signal and being forwarded to a plurality of terminating user devices, and forwarding one response signal of the plurality of response signals to the originating user equipment.

Further, according to an embodiment of the present invention, there is provided a connection control method to be executed by a communication system including an inter-network connection control device that is used for interconnecting a communication network and another communication network, and a forking service device installed in the other network, the connection control method including a step, by the inter-network connection control device, of forwarding a connection request signal transmitted from originating user equipment in the communication network to the forking service device in the other communication network; a step, by the forking service device that receives the connection request, of forking and transmitting the connection request signal to a plurality of terminating user devices, receiving a plurality of response signals with respect to the connection request from the plurality of terminating user devices, and transmitting the plurality of response signals to the inter-network connection control device; and a step, by the inter-network connection control device, of receiving the plurality of response signals from the forking service device, and forwarding one response signal of the plurality of response signals to the originating user equipment.

Advantage of the Invention

According to an embodiment of the present invention, there is provided a technique, in an interconnected network where a plurality of communication networks is connected, for allowing communication according to forking to be properly executed between a communication network supporting forking and a communication network not supporting forking.

EMBODIMENTS OF THE INVENTION

An embodiment of the present invention is described below by referring to the drawings. However, the embodiment described below is merely an example; and embodiments to which the present invention is applied are not limited to the embodiment described below. For example, it is assumed that each operator's network described below is a core network of a mobile network operator; however, the present invention is applicable regardless of whether the operator's network is the core network.

(Overall Structure of the System)

Figure 3:
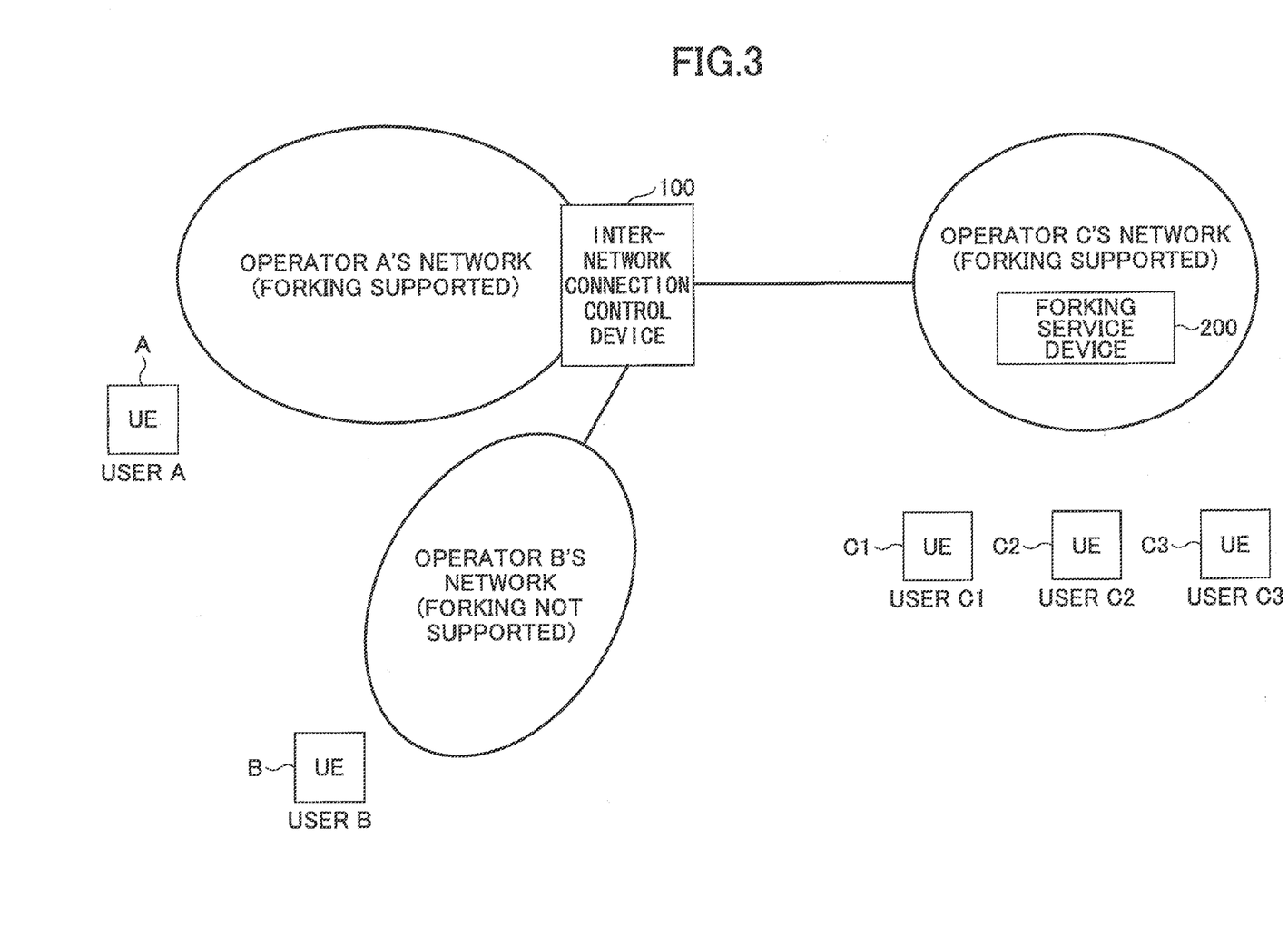
FIG. 3 is an overall configuration diagram of a system according to an embodiment of the present invention.

FIG. 3 is a diagram illustrating an example of a configuration of an IP interconnection network (which is referred to as the "interconnection network," hereinafter) in the embodiment. As a connection configuration between operator's networks, the network configuration illustrated here is the same as the configuration illustrated in FIG. 1 and FIG. 2.

Namely, the interconnection network illustrated in FIG. 3 is a network where an operator A's network that is a network of an operator A, an operator B's network that is a network of an operator B, and an operator C's network that is a network of an operator C are interconnected. Each operator's network is a communication network where session control is executed by the SIP (Session Initiation Protocol).

FIG. 3 is a diagram where the operator A's network is especially focused on, and an inter-network connection control device 100 is illustrated, which is installed at a boundary portion of the operator A's network. However, an inter-network connection control device may be installed at a boundary portion of another operator's network. The inter-network connection control device 100 according to the embodiment is, for example, a device including an IBCF (Interconnection Border Control Function) of the IMS and/or a function of a TrGW (Transition Gateway).

In the example of FIG. 3, the operator A's network and the operator C's network are IMS networks, so that forking is supported. The operator B's network is a non-IMS network, and forking is not supported. For example, the operator B's network is an IP centrex network for use within the company of the operator B. As described above, to support forking means, for example, that the forking model of the CAT specified in Non-Patent Document 2 is supported. However, even if the forking model of the CAT specified in Non-Patent Document 2 is not supported, there is a case where forking according to another service is supported. It is assumed that the operator B's network does not support any forking. Additionally, in the embodiment, "the operator B's network" is interpreted as a network including an originating terminal (UE); and the case where a network that relays a signal supports forking and an originating terminal connected to the network does not support forking is included in a case where "the operator B's network does not support forking."

Though it is not depicted, in each operator's network of FIG. 3, a device is installed that executes session control according to the SIP (Session Initiation Protocol). Transmission and reception of signals are performed through the device. The device is, for example, a device including a function of S-CSCF (Serving-Call Session Control Function) in the IMS network.

Additionally, as illustrated in FIG. 3, in the operator C's network, a forking service device 200 is installed that includes a function to fork and transmit a connection request signal by forking. The forking service device 200 is, for example, the CAT-AS supporting the forking model, which is described in Non-Patent Document 2.

However, a service using forking, which can be provided by the forking service device 200, is not limited to the forking model for transmission of the CAT media; and another service may be provided. As an example of the other service, there is a service for establishing a representative number connection by forwarding the RBT (a ringback tone) from the terminating UE, without transmitting early media from the forking service device 200.

(Device Configuration)

Figure 4:
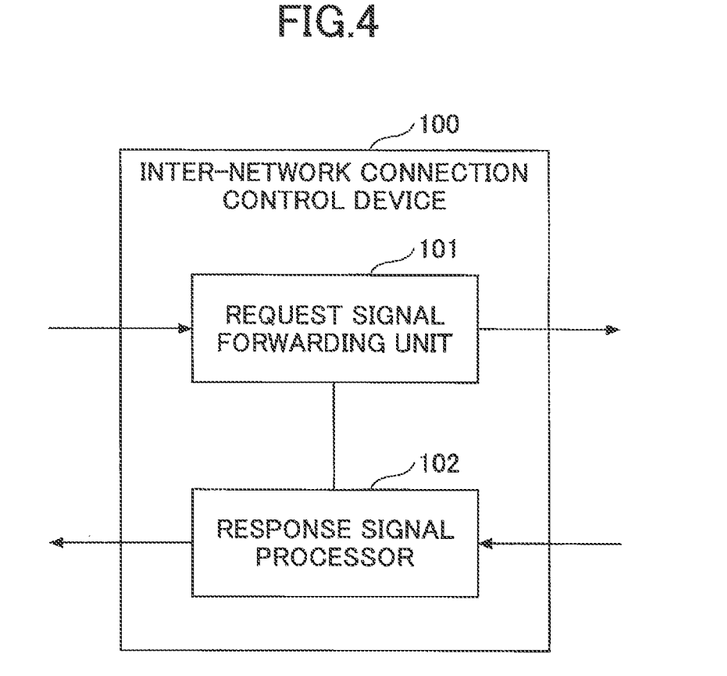
FIG. 4 is a functional configuration diagram of an inter-network connection control device 100.

Next, an example of a configuration of the inter-network connection control device 100 in the above-described system is described. FIG. 4 illustrates a functional configuration diagram of the inter-network connection control device 100 according to the embodiment. As illustrated in FIG. 4, the inter-network connection control device 100 includes a request signal forwarding unit 101; and a response signal processor 102.

Note that FIG. 4 illustrates only functional units, in the inter-network connection control device 100, that are particularly related to the embodiment of the present invention; and the inter-network connection control device 100 also includes a function for executing operation for establishing a connection between operator's networks, which is not depicted. Furthermore, the functional configuration illustrated in FIG. 4 is merely an example. The functional division and the names of the functional units may be any functional division and any names, provided that the operation according to the embodiment can be executed.

The request signal forwarding unit 101 includes a function for receiving a connection request signal that is transmitted from a UE (user equipment) and that is forwarded by a device (e.g., the S-CSCF in the IMS network) that executes SIP session control in the operator A's network/the operator B's network; and for forwarding the connection request signal to another network (which is the operator C's network in this embodiment) in accordance with a destination of the connection request signal. The request signal forwarding unit 101 may include, for example, a function to execute conversion of a SIP message, so as to absorb a difference of the SIP message between operators.

The response signal processor 102 includes a function for receiving a plurality of response signals (e.g., temporary response signals) that is forwarded, in response to transmission of connection request signals by forking, from the operator C's network to the operator A's network/the operator B's network; and for selecting one response signal of the plurality of response signals to be forwarded to the UE that originates the connection request signal. Note that the response signal to be selected is not limited to one response signal, and a plurality of response signals, which is a part of the plurality of received response signals, may be selected to be forwarded.

Note that the request signal forwarding unit 101 is not limited to transmitting and receiving request signals in the SIP; and the request signal forwarding unit 101 may transmit and receive response signals. The request signal forwarding unit 101 may further include a function for transmitting and receiving media data, such as audio and video. Furthermore, the response signal processor 102 is not limited to transmitting and receiving response signals in the SIP; and the response signal processor 102 may transmit and receive request signals. The response signal processor 102 may further include a function for transmitting and receiving media data, such as audio and video.

The inter-network connection control device 100 according to the embodiment can be implemented, for example, by causing one or a plurality of computers (servers) to execute a program in which processing details described in the embodiment are described. Namely, the functions included in the inter-network control device 100 can be implemented by executing a program corresponding to the process to be executed by the inter-network control device 100 by using hardware resources included in the computer, such as a CPU and a memory. Further, the above-described program may be stored in a computer readable recording medium (e.g., a portable memory), so that the above-described program is to be saved, or to be distributed. Furthermore, the above-described program may be provided through a network, such as by the Internet or by an e-mail.

Figure 5:
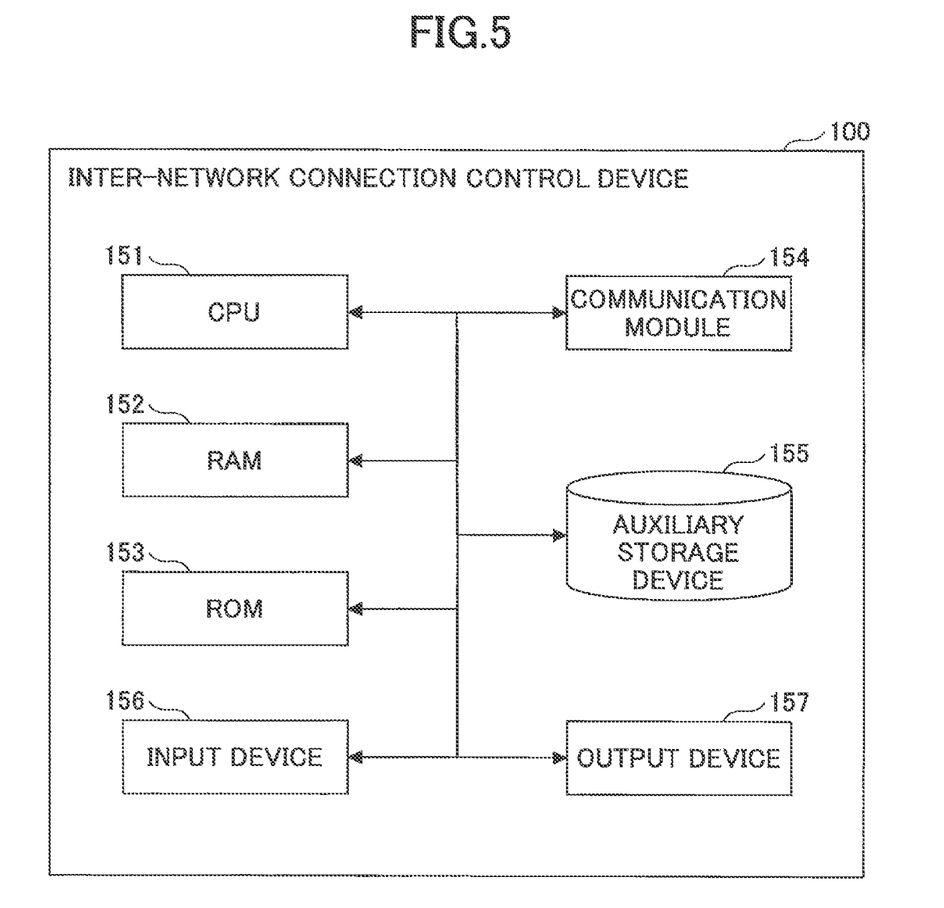
FIG. 5 is a diagram illustrating an example of a hardware configuration of the inter-network connection control device 100.

An example of a hardware configuration of the inter-network connection control device 100 is illustrated in FIG. 5 for a case where the inter-network connection control device 100 is formed of a computer, such as the above-described computer.

As illustrated in FIG. 5, the inter-network connection control device 100 includes a CPU 151; a RAM (Random Access Memory) 152; a ROM (Read Only Memory) 153; a communication module 154 for executing communication; an auxiliary storage device 155, such as a hard disk; an input device 156; and an output device 157.

The operation of each of the functions of the request signal forwarding unit 101 and the response signal processor 102 is executed by reading out and executing, by the CPU 151, a program stored in a storage unit, such as the RAM 152, the ROM 153, or the auxiliary storage device 155. Further, among the processes by each of the functional units of the request signal forwarding unit 101 and the response signal processor 102, for a process for which network communication is to be executed, the communication module 154 is used. Furthermore, by the input device 156, for example, setting information can be input to the inter-network connection control device 100; and by the output device 157, for example, an operation condition of the inter-network connection control device 100 can be output.

EXAMPLE OF OPERATION OF THE SYSTEM

Example 1 of a Connection Sequence

Figure 6:
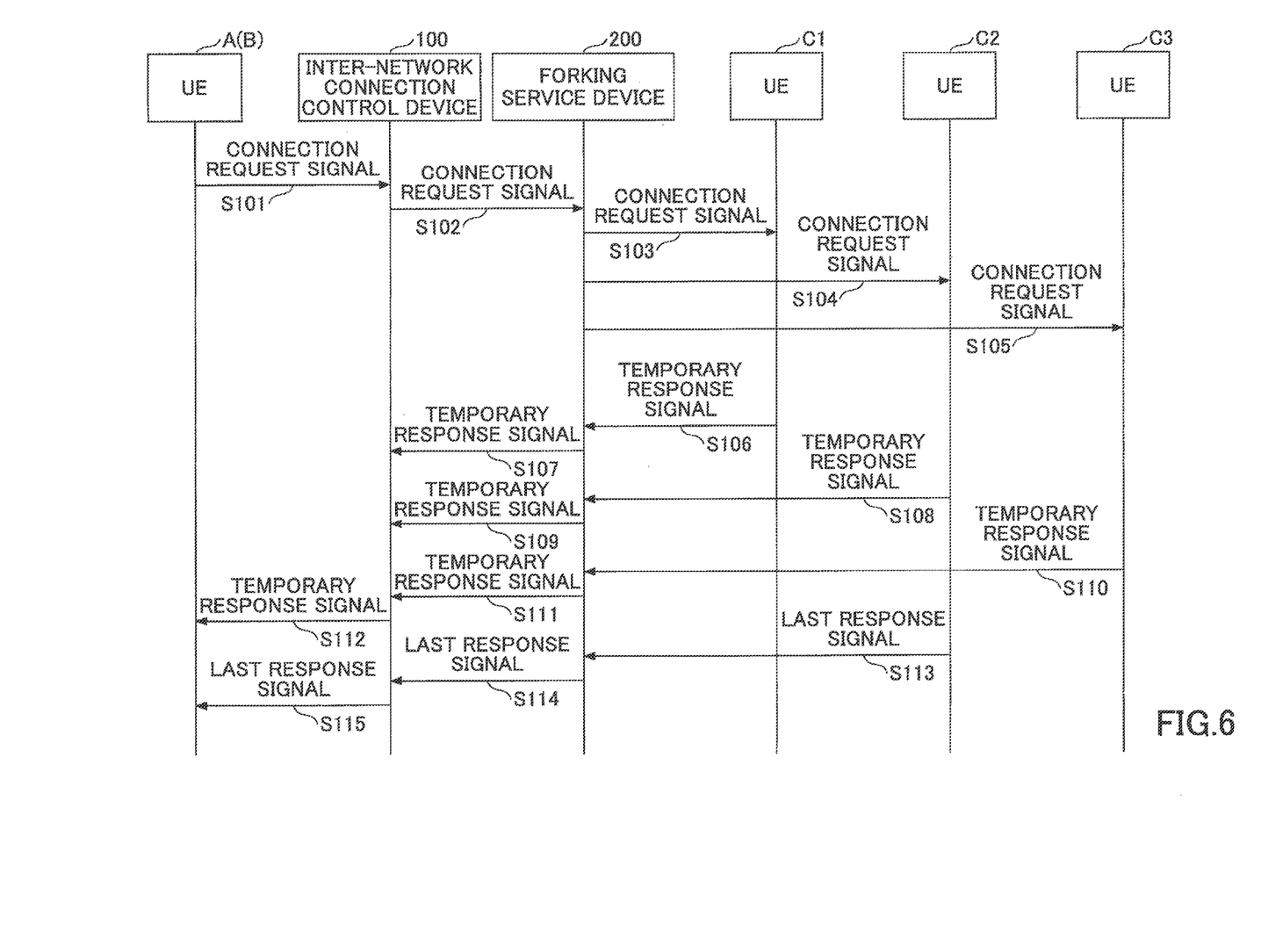
FIG. 6 is a diagram illustrating an example 1 of a connection sequence.

Next, as an example of operation of the system according to the embodiment, an example 1 of a connection sequence is described by referring to FIG. 6. In the example 1 of the connection sequence, since processing details are the same for originating from the operator A's network and for originating from the operator B's network, originating from the operator A's network (UE-A) is illustrated, as an example. In FIG. 6, the fact that it is the same for originating from the operator B's network is indicated by "(B)."

Upon a user A performing, in the UE-A, for example, an operation for originating to a representative number that is common among UE-C1 through UE-C3 (which is referred to as the "user C's representative number"), a connection request signal is transmitted that includes, as a destination, the user C's representative number (Step 101). The request signal forwarding unit 101 in the inter-network connection control device 100 receives the forwarded connection request signal; and the request signal forwarding unit 101 forwards the connection request signal to the operator C's network. The connection request signal is forwarded to the forking service device 200 (Step 102).

The forking service device 200 transmits, by the forking function, the connection request signals to the UE-C1 through the UE-C3, which correspond to the user C's representative number (Steps 103 through 105).

Each of the UE-C1 through the UE-C3 receiving the connection request signals transmits a response signal (which is a temporary response signal here, as an example); and the response signals are forwarded to the forking service device 200 (Steps 106, 108, and 110). Upon receiving the temporary response signal from each UE, the forking service device 200 transmits the temporary response signals from the corresponding UEs, and the temporary response signals are forwarded to the inter-network connection control device 100 (Steps 107, 109, and 111).

By steps 107, 109, and 111, the response signal processor 102 of the inter-network connection control device 100 receives the three temporary response signals.

The response signal processor 102 receiving the three temporary response signals selects, from the three temporary response signals, one temporary response signal; the response signal processor 102 transmits the temporary response signal to the UE-A; and the UE-A receives the temporary response signal (step 112). Though this example is a case where the operator A's network is the originating source, even for a case where the operator B's network, which does not support forking, is the originating source, since transmitting one temporary response signal is a usual process, the temporary response signal normally reaches the UE, which is the originating source. Additionally, the response signal processor 102 retains information on the temporary response signals that are not selected (e.g., information for identifying the dialog, or information on the media).

In FIG. 6, it is illustrated that, after receiving the three temporary response signals, the inter-network connection control device 100 transmits one temporary response signal to the UE-A; however, this is for convenience of depiction. For example, immediately after receiving a first temporary response signal, the temporary response signal may be transmitted to the UE-A.

Based on the temporary response signal, the RBT is output at the UE-A, for example. Further, in response to detecting that the temporary response signal includes codec information of the media, and that an acknowledgement with respect to the temporary response signal is returned to the forking service device 200, the media, such as announcement, may be transmitted from the forking service device 200 to the UE-A.

A method, by the response signal processor 102, of selecting, from the three temporary response signals, one temporary response signal is not limited to a specific method. However, for example, the temporary response signal received at first may be selected and transmitted to the UE-A; and the temporary response signal that is received after receiving the first temporary response signal (the temporary response signal with respect to the connection request signal transmitted at step 101) may not be transmitted to the UE-A.

Alternatively, for example, the forking service device 200 (or each UE) may transmit each temporary response signal, while including, in the temporary response signal, identification information of the UE that is the originating source of the temporary signal and identification information indicating that it is a temporary response signal with respect to the connection request signal received by forking. After receiving, by the response signal processor 102, the plurality of temporary response signals, each of which includes the identification information, the response signal processor 102 may select, from the plurality of temporary response signals with respect to the connection request signal according to forking, the temporary response signal from a specific UE to transmit. The specific UE may be set, in advance, in the response signal processor 102, as a UE that is most likely to transmit a final response, for example.

After that, for example, among the UE-C1 through the UE-C3 receiving the connection request signals by forking, a user of the UE-C2 performs a response operation earliest, and the final response signal is transmitted from the UE-C2 (Step 113). The final response signal is forwarded to the UE-A through the forking service device 200 and the inter-network control device 100 (the response signal processor 102) (Steps 114 and 115). Consequently, a call session is established between the UE-A and the UE-C2, and a call can be performed.

Note that, for a case where the temporary response signal transmitted at step 112 corresponds to the UE-C2, a call session is established between the UE-A and the UE-C2 by forwarding, by the inter-network connection control device 100, the final response signal transmitted from the UE-C2 to the UE-A, as it is.

Whereas, for a case where the temporary response signal transmitted at step 112 does not correspond to the UE-C2, and corresponds, for example, to the UE-C1, the UE-A may be caused to switch from a call connection with the UE-C1 to a call connection with the UE-C2 by transmitting, by the response signal processor 102 of the inter-network connection control device 100, after receiving the final response signal transmitted from the UE-C2, for example, an instruction signal for call switching (e.g., UPDATE, re-Invite, and other signals) including the retained information on the temporary response signal from the UE-C2 (e.g., information for identifying a dialog (call)) to the UE-A; and, after that, the final response signal transmitted from the UE-C2 may be transmitted to the UE-A. Here, the process is merely an example, and a call connection with the UE-C2 may be established by another method.

Example 2 of the Connection Sequence

Figure 7:
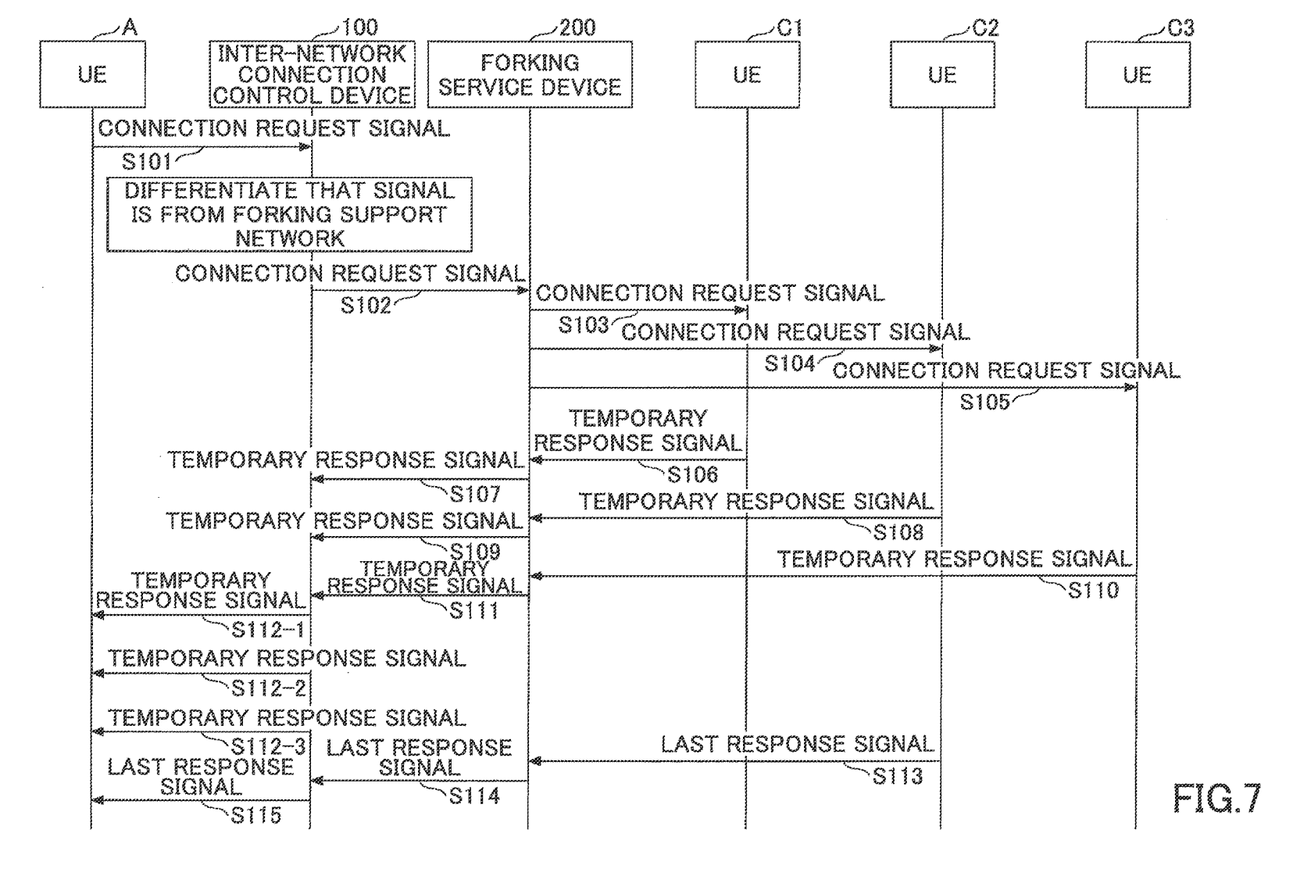
FIG. 7 is a diagram illustrating an example 2 of the connection sequence.

Next, as an example of operation of the system according to the embodiment, an example 2 of the connection sequence is described by referring to FIG. 7. In the example 2 of the connection sequence, processing details are different for originating from the operator A's network that supports forking and for originating from the operator B's network that does not support forking. The case of originating from the operator B's network that does not support forking is the same as the example 1 of the connection sequence. FIG. 7 illustrates a case of originating from operator A's network. In FIG. 7, the same step numbers are used for steps that are the same as those of the example 1 of the connection sequence, and these are briefly described.

Upon the user A performing, in the UE-A, an operation for originating to the user C's representative number, a connection request signal is transmitted that includes, as a destination, the user C's representative number (Step 101); and the connection request signal is forwarded to the forking service device 200 through the inter-network connection control device 100 (Step 102). The forking service device 200 transmits, by the forking function, the connection request signals to the UE-C1 through the UE-C3, which correspond to the user C's representative number (Steps 103 through 105).

In the example 2 of the connection sequence, the request signal forwarding unit 101 of the inter-network connection control device 100 receiving the connection request signal at step 101 determines that the connection request signal is transmitted from a network that supports forking. The method of determining is not limited to a specific method; however, a determination is made from the address of the transmission source of the connection request signal, for example. In this case, it is assumed that the request signal forwarding unit 101 retains information indicating which address is the address of the network that supports forking.

Each of the UE-C1 through the UE-C3 receiving the connection request signals transmits a temporary response signal; and the temporary response signals are forwarded to the forking service device 200 (Steps 106, 108, and 110), and are forwarded to the inter-network connection control device 100 (Steps 107, 109, and 111).

By steps 107, 109, and ill, the response signal processor 102 of the inter-network connection control device 100 receives the three temporary response signals.

The response signal processor 102 receiving the three temporary response signals recognizes, based on the above-described determination result, that each of the temporary response signals is a response with respect to the connection request signal transmitted from the network that supports forking; and, as a consequence, the response signal processor 102 does not execute the process of selecting one temporary response signal. Thus, the response signal processor 102 transmits the temporary response signals to the UE-A; and the UE-A receives the temporary response signals (Steps 112-1 through 112-3).

After that, for example, among the UE-C1 through the UE-C3 receiving the connection request signals by forking, a user of the UE-C2 performs a response operation earliest, and the final response signal is transmitted from the UE-C2 (Step 113). The final response signal is forwarded to the UE-A through the forking service device 200 and the inter-network control device 100 (the response signal processor 102) (Steps 114 and 115). Consequently, a call session is established between the UE-A and the UE-C2, and a call can be performed.

Example 3 of the Connection Sequence

Figure 8:
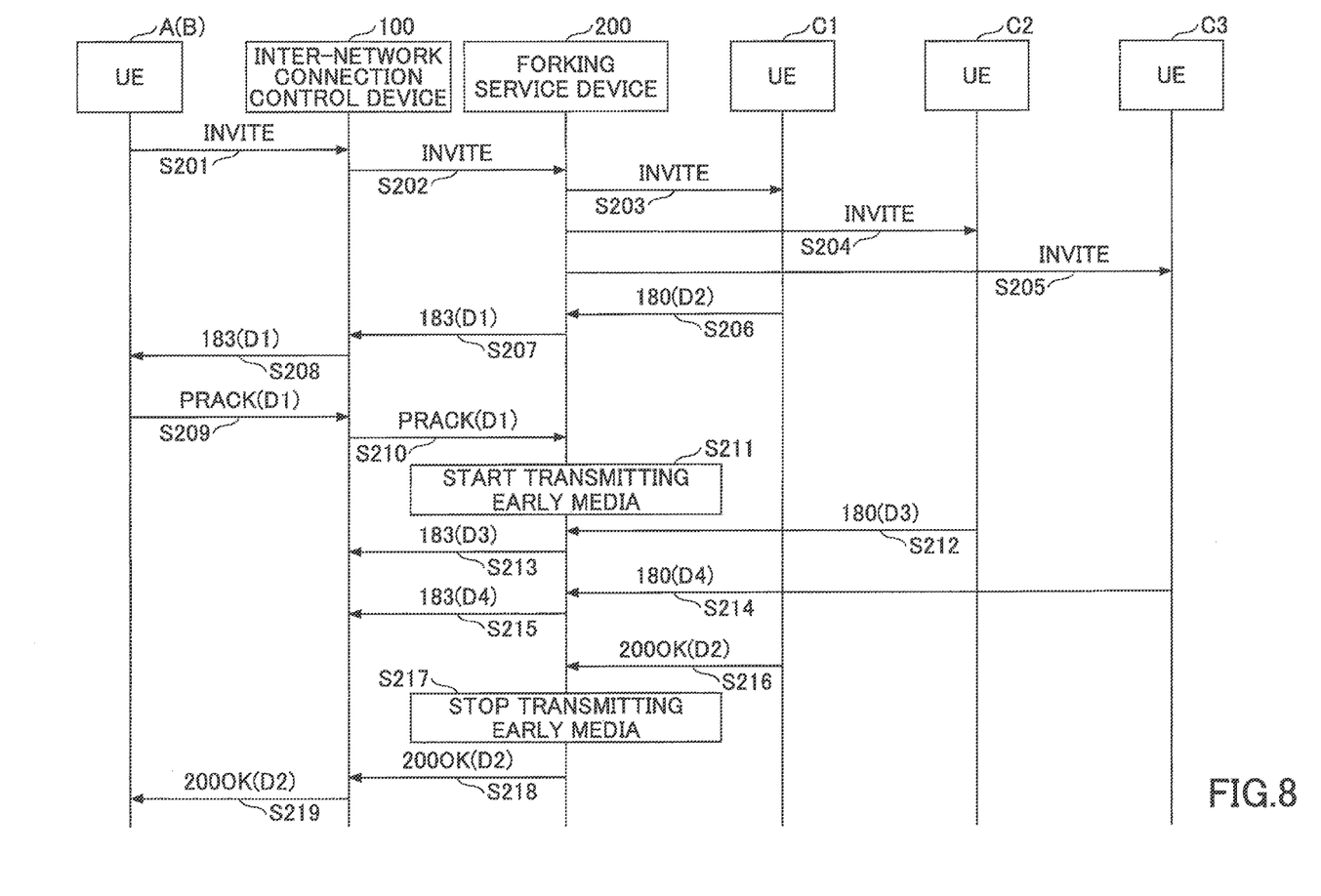
FIG. 8 is a diagram illustrating an example 3 of the connection sequence.

Next, as an example of operation of the system according to the embodiment, an example 3 of the connection sequence is described by referring to FIG. 8. In the example 3 of the connection sequence, it is assumed that the forking service device 200 is the CAT-AS that supports the forking model of the CAT, which is specified in Non-Patent Document 2, and a more specific example is described.

Similar to the example 1 of the connection sequence, in the example 3 of the connection sequence, since processing details are the same for originating from the operator A's network and for originating from the operator B's network, originating from the operator A's network (UE-A) is illustrated, as an example. In FIG. 8, the fact that it is the same for originating from the operator B's network is indicated by "(B)." Further, in the following description, for each signal, a specific name of the signal and dialog identification information (e.g., D1 and D2) are described in the parentheses. Furthermore, in this example, it is assumed that each device including the UE has sufficient resources to process a plurality of dialogs.

Upon a user A performing, in the UE-A, an operation for originating to the user C's representative number, a connection request signal (INVITE) is transmitted that includes, as a destination, the user C's representative number (Step 201). The request signal forwarding unit 101 in the inter-network connection control device 100 receives the forwarded connection request signal (INVITE); and the request signal forwarding unit 101 forwards the connection request signal (INVITE) to the operator C's network. The connection request signal (INVITE) is forwarded to the forking service device 200 (Step 202).

The forking service device 200 transmits, by the forking function, the connection request signals (INVITE) to the UE-C1 through the UE-C3, which correspond to the user C's representative number (Steps 203 through 205).

As an example, the UE-C1 receiving the connection request signal transmits the temporary response signal (180, D2) earliest; and the temporary response signal (180, D2) is forwarded to the forking service device 200 (step 206). The forking service device 200 receiving the temporary response signal (180, D2) from the UE-C1 transmits a temporary response signal (183, D1); and the temporary response signal (183, D1) is forwarded to the inter-network connection control device 100 (step 207).

Since, in this example, it is assumed that the temporary response signal (183) received at earliest is to be transmitted to the UE-A, the response signal processor 102 of the inter-network connection control device 100 forwards the temporary response signal (183, D1) to the UE-A (Step 208), causes the UE-A to establish an early dialog, receives an acknowledgement signal (PRACK, D1) from the UE-A (Step 209), and forwards the acknowledgement signal (PRACK, D1) to the forking service device 200 (Step 210). For example, the temporary response signal (183, D1) includes codec information of the early media; and the UE-A receiving the temporary response signal (183, D1) can receive and decode the early media.

Upon receiving the acknowledgement signal (PRACK, D1), the forking service device 200 starts transmitting the early media to the UE-A (Step 211).

The response signal processor 102 of the inter-network connection control device 100 receives a temporary response signal (183, D3) from the UE-C2, and receives a temporary response signal (183, D4) from the UE-C3 (Steps 214 and 215). However, since the temporary response signal (183, D1) has already been transmitted to the UE-A, the temporary response signals (183) received from the UE-C2 and C3 are not forwarded to the UE-A, and the information thereof is retained in a storage unit, such as a memory.

After that, for example, among the UE-C1 through the UE-C3 receiving the connection request signal by forking, the user of the UE-C1 performs a response operation at earliest; and the final response signal (200OK, D2) is transmitted from the UE-C1 (Step 216). The forking service device 200 receiving the final response signal (200OK, D2) stops transmitting the early media (Step 217), and transmits the final response signal (200OK, D2) to the inter-network connection control device 100 (Step 218); and the inter-network connection control device 100 forwards the final response signal (200OK, D2) to the UE-A (Step 219). Consequently, a call session is established between the UE-A and the UE-C1, and a call can be performed.

Note that, at step 216, for a case where the final response signal (200OK) is transmitted, for example, from the UE-C2 (the case of 200OK, D3), instead of the UE-C1, the forking service device 200 receiving it stops transmitting the early media (step 217), and forwards the final response signal (200OK, D3) to the inter-network connection control device 100 (Step 218). After transmitting, for example, a signal for causing the dialog (call) to be switched from D2 to D3, the inter-network connection control device 100 forwards the final response signal (200OK, D3) to the UE-A (Step 219). Consequently, a call session is established between the UE-A and the UE-C2, and a call can be performed.

As described above, according to the embodiment, there is provided an inter-network connection control device that is used for interconnecting a communication network and another communication network, the inter-network connection control device includes a request signal forwarding unit that forwards a connection request signal transmitted from originating user equipment in the communication network to the other communication network; and a response signal processor that receives, from the other communication network, a plurality of response signals with respect to the connection request signal, the plurality of response signals being forked in the other communication network receiving the connection request signal and being forwarded to a plurality of terminating user devices, and that forwards one response signal of the plurality of response signals to the originating user equipment.

By adopting the above-described configuration, it becomes possible, in an interconnected network where a plurality of communication networks is connected, to properly perform communication according to forking between a communication network supporting forking and a communication network not supporting forking. Note that "the communication network not supporting forking" here includes a case where a network that relays a signal supports forking, and a terminal that is connected to the network and that is the originating source (which is included in the communication network) does not support forking.

Among the plurality of response signals received from the other network, the response signal processor forwards, for example, the response signal received at earliest to the originating user equipment. With this configuration, a response signal can be quickly transmitted, by relatively simple control, to the originating user equipment.

In the communication network that is the originating source of the connection request signal, the request signal forwarding unit may determine whether a forking service for forking and terminating the connection request signal is supported; and, upon detecting that the forking service is supported by the communication network, the response signal processor may forward the plurality of response signals to the originating user equipment. With this configuration, the network that can process a plurality of response signals can be caused not to execute the process for selecting a response signal.

For example, the response signal is a temporary response signal; and the originating user equipment can be caused to establish the early dialog by forwarding, by the response signal processor, the temporary response signal to the the originating user equipment. With this configuration, for example, a service conforming to the forking model of the the CAT media can be provided.

With this configuration, a connection can be established between originating user equipment and terminating user equipment, regardless of, from which terminating user equipment, the final response is received.

For example, each of the communication networks is a communication network where session control by the SIP is executed, and the inter-network connection control device is installed at a boundary portion of the network. In this manner, by setting, as a target, a communication network where session control by the SIP is executed, for example, the present invention can be effectively applied to the IMS network and other SIP networks.

The embodiment of the present invention is described above; however the disclosed invention is not limited to such an embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. For the convenience of explanation, the inter-network connection control device 100 is described by using the functional block diagrams. However, the inter-network connection control device 100 may be implemented in hardware, software, or combinations thereof. The software to be operated by the processor included in the inter-network connection control device 100 in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

The present invention is not limited to the above-described embodiment; and various variations, modifications, alternatives, replacements, and so forth are included in the present invention without departing from the spirit of the present invention.

This patent application is based upon and claims the benefit of priority of Japanese Patent Application No. 2014-263560 filed on Dec. 25, 2014, and the entire contents of Japanese Patent Application No. 2014-263560 are incorporated herein by reference.

LIST OF REFERENCE SYMBOLS 10, 100: inter-network connection control device
20, 200: forking service device
101: request signal forwarding unit
102: response signal processor
151: CPU
152: RAM
153: ROM
154: communication module
155: auxiliary storage device
156: input device
157: output device

The invention claimed is:

1. An inter-network connection control device that is used for interconnecting a first communication network and a second communication network, the inter-network connection control device comprising:

a transmitter that forwards a connection request signal transmitted from originating user equipment in the first communication network to the second communication network;

a receiver that receives, from the second communication network, a plurality of response signals with respect to the connection request signal, the plurality of response signals being forked in the second communication network and being forwarded to a plurality of terminating user devices; and a processor that determines whether a forking service for forking and terminating the connection request signal is supported in the first communication network;

wherein, upon determining that the forking service is supported in the first communication network, the transmitter forwards at least one of the plurality of response signals to the originating user equipment.

2. The inter-network connection control device according to claim 1, wherein the transmitter forwards, among the plurality of response signals received from the second communication network, an earliest-received response signal to the originating user equipment.

3. The inter-network connection control device according to claim 2, wherein the plurality of response signals comprises a temporary response signal, and the transmitter forwards, to the originating user equipment, the temporary response signal causing the originating user equipment to establish an early dialog.

4. The inter-network connection control device according to claim 2, wherein, when the receiver receives, after the transmitter forwards the at least one of the plurality of response signals to the originating user equipment, a final response signal transmitted from a terminating user device other than the terminating user device corresponding to the at least one of the plurality of response signals from the second communication network, the transmitter transmits, after the transmitter transmits a signal for instructing the originating user equipment to switch a call, the final response signal to the originating user equipment.

5. The inter-network connection control device according to claim 2, wherein each of the first communication network and the second communication network is a network where session control according to a Session Initiation Protocol (SIP) is executed, and the inter-network connection control device is installed at a boundary portion of the first communication network.

6. The inter-network connection control device according to claim 1, wherein the plurality of response signals comprises a temporary response signal, and the transmitter forwards, to the originating user equipment, the temporary response signal causing the originating user equipment to establish an early dialog.

7. The inter-network connection control device according to claim 6, wherein, when the receiver receives, after the transmitter forwards the at least one of the plurality of response signals to the originating user equipment, a final response signal transmitted from a terminating user device other than the terminating user device corresponding to the at least one of the plurality of response signals from the second communication network, the transmitter transmits, after the transmitter transmits a signal for instructing the originating user equipment to switch a call, the final response signal to the originating user equipment.

8. The inter-network connection control device according to claim 6, wherein each of the first communication network and the second communication network is a network where session control according to a Session Initiation Protocol (SIP) is executed, and the inter-network connection control device is installed at a boundary portion of the first communication network.

9. The inter-network connection control device according to claim 1, wherein, when the receiver receives, after the transmitter forwards the at least one of the plurality of response signals to the originating user equipment, a final response signal transmitted from a terminating user device other than the terminating user device corresponding to the at least one of the plurality of response signals from the second communication network, the transmitter transmits, after the transmitter transmits a signal for instructing the originating user equipment to switch a call, the final response signal to the originating user equipment.

10. The inter-network connection control device according to claim 9, wherein each of the first communication network and the second communication network is a network where session control according to a Session Initiation Protocol (SIP) is executed, and the inter-network connection control device is installed at a boundary portion of the first communication network.

11. The inter-network connection control device according to claim 1, wherein each of the first communication network and the second communication network is a network where session control according to a Session Initiation Protocol (SIP) is executed, and the inter-network connection control device is installed at a boundary portion of the first communication network.

12. The inter-network connection control device according to claim 1,
wherein the transmitter forwards all of the plurality of response signals to the originating user equipment.

13. A connection control method for an inter-network connection control device that is used for interconnecting a first communication network and a second communication network, the connection control method comprising:
forwarding a connection request signal transmitted from an originating user equipment in the first communication network to the second communication network;
receiving, from the second communication network, a plurality of response signals with respect to the connection request signal, the plurality of response signals being forked in the second communication network and being forwarded to a plurality of terminating user devices;
determining whether a forking service for forking and terminating the connection request signal is supported in the first communication network; and
forwarding, upon determining that the forking service is supported in the first communication network, at least one of the plurality of response signals to the originating user equipment.

14. A connection control method to be executed by a communication system including an inter-network connection control device that is used for interconnecting a first communication network and a second communication network, and a forking service device installed in the second network, the connection control method comprising:
forwarding, from the inter-network connection control device to the forking service device in the second communication network, a connection request signal transmitted from originating user equipment in the first communication network;
forking and transmitting, by the forking service device that receives the connection request, the connection request signal to a plurality of terminating user devices;
receiving, with the forking service device, a plurality of response signals with respect to the connection request from the plurality of terminating user devices;
transmitting, from the forking service device to the inter-network connection control device, the plurality of response signals;
receiving, with the inter-network connection control device, the plurality of response signals connection request signal from the forking service device;
determining, with the inter-network connection control device, whether a forking service for forking and terminating the connection request signal is supported in the first communication network; and
forwarding, from the inter-network connection control device to the originating user equipment, at least one of the plurality of response signals.

* * * * *